(12) United States Patent
Blumenau et al.

(10) Patent No.: US 6,240,511 B1
(45) Date of Patent: May 29, 2001

(54) METHOD AND APPARATUS FOR DETECTING SYSTEM CONFIGURATION CHANGES

(75) Inventors: Steven M. Blumenau, Holliston; Steven Cohen, Westboro; John F. Madden, Jr., Holden, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/211,131

(22) Filed: Dec. 14, 1998

(51) Int. Cl.[7] .................................................. G06F 9/44
(52) U.S. Cl. ................................. 713/1; 713/100
(58) Field of Search ................... 713/1, 2, 100; 709/220; 714/3

(56) References Cited

U.S. PATENT DOCUMENTS 5,745,669 * 4/1998 Hugard et al. ............................ 714/3
5,913,921 * 6/1999 Tosey et al. .......................... 709/220

* cited by examiner

Primary Examiner—Thomas M. Heckler
(74) Attorney, Agent, or Firm—Wolf, Greenfield & Sacks, P.C.

(57) ABSTRACT

Method and apparatus for detecting changes in a configuration of a computer system including a host computer and at least one computer system resource. Information relating to a reference configuration of the computer system is stored at a first point in time. A current configuration of the computer system is determined at a second point in time. The current configuration of the computer system is compared with the reference configuration to determine whether the current configuration differs from the reference configuration. An indication is provided when the current configuration of the computer system differs from the reference configuration.

48 Claims, 4 Drawing Sheets

METHOD AND APPARATUS FOR DETECTING SYSTEM CONFIGURATION CHANGES

FIELD OF THE INVENTION

The present invention is directed to a method and apparatus for detecting changes in a configuration of a computer system.

DESCRIPTION OF THE RELATED ART

Many computer systems include one or more host computers and one or more system resources that are accessible thereby. An example of such a computer system is shown in FIG. 1, and includes a host computer 1 and a storage system 3 that serves as a system resource accessible by the host computer 1. The storage system 3 includes a plurality of storage devices on which data are stored. In the exemplary system shown in FIG. 1, the storage system 3 includes a plurality of disk drives 5a and 5b and a plurality of disk controllers 7a–7b that respectively control access to the disk drives 5a and 5b. The storage system 3 further includes a plurality of storage bus directors 9a–d that control communication with the host computer 1 over communication buses 17a–d. Communications buses 17a–d interface to the storage system 3 through ports 18a–d. Finally, the storage system 3 includes an internal bus 13 over which the storage bus directors 9a–d and the disk controllers 7a–7b communicate.

The host computer 1 includes a processor 16 and one or more host bus adapters 15a–d that each controls communication between the processor 16 and the storage system 3 via a corresponding one of the communication buses 17a–d. It should be appreciated that rather than a single processor 16, the host computer 1 can include multiple processors. Each of the buses 17a–d can be any of a number of different types of communication links, with each of the host bus adapters 15a–d and the storage bus directors 9a–d being adapted to communicate using an appropriate protocol for the communication bus coupled between them. For example, each of the communication buses 17a–d can be implemented as a SCSI bus, with the directors 9a–d and adapters 15a–d each being a SCSI driver. Alternatively, communication between the host computer 1 and the storage system 3 can be performed over a Fibre Channel fabric, where the buses 17a–d are Fibre Channel links.

As shown in the exemplary system of FIG. 1, some computer systems employ multiple paths for communicating between the host computer 1 and the storage system 3 (e.g., each path includes one of the host bus adapters 15a–d, one of the buses 17a–d, one of the ports 18a–d, and one of the storage bus directors 9a–d in FIG. 1). In some such systems, each of the host bus adapters 15a–d has the ability to access each of the disk drives 5a–b, through an appropriate storage bus director and disk controller.

FIG. 2 is a schematic representation of a number of mapping layers that may exist in a computer system such as the one shown in FIG. 1. The mapping layers include an application layer 21 which includes application programs executing on the processor 16 of the host computer 1. The application layer 21 will generally refer to data objects used thereby with a label or identifier such as a file name, and will have no knowledge about where the corresponding file is physically stored on the storage system 3 (FIG. 1). In addition, the host computer 1 also includes a file system and/or logical volume manager (LVM) layer 23 that maps each data object specified by the application layer 21 to a particular logical volume (that the host computer 1 perceives to correspond to an actual physical storage device) wherein the data object is stored. The file system/LVM layer 23 will generally refer to a logical volume (also referred herein as a "raw storage device") using a label or identifier that is at least partially descriptive of a physical component of the computer system that is used by the host computer 1 when accessing the logical volume. The physically descriptive information may include, for example, information descriptive of the one of the multiple paths via which the logical volume may be accessed, as well as a unique identifier for the raw storage device. For example, for a SCSI connection, the device identifier "/dev/dsk/c0t0d0" may be used to refer to a raw storage device or logical volume accessible at a channel zero (c0) (which can be any of the multiple paths in FIG. 1), and having a target number zero (t0) and a logical unit number (LUN) zero (d0) that together uniquely identify the raw storage device.

Below the file system/LVM layer 23 is a multi-path mapping layer 25 that maps the logical volume address specified by the file system/LVM layer 23, through a particular one of the multiple system paths, to the logical volume address to be presented to the storage system 3. Thus, the multi-path mapping layer 25 not only specifies a particular logical volume address, but also specifies a particular one of the multiple system paths used to access the specified logical volume.

If the storage system 3 were not an intelligent storage system, the logical volume address specified by the multi-pathing layer 25 would identify a particular raw physical device (e.g., one of the disk drives 5a–b) within the storage system 3. However, in an intelligent storage system such as that shown in FIG. 1, the storage system itself may include a further mapping layer 27, such that the logical volume address passed from the host computer 1 may not correspond directly to an actual physical device (e.g., a disk drive 5a–b) in the storage system 3. Rather, a logical volume specified by the host computer 1 can be spread across multiple physical storage devices (e.g., disk drives 5a–b) or multiple logical volumes accessed by the host computer 1 can be stored on a single physical storage device.

As discussed above, application programs running in the application layer 21 typically access logical volumes within the storage system 3 via the file system/LVM layer 23, which uses device identifiers for the logical volumes that include information descriptive of a physical component of the computer system through which the logical volumes are accessed. This can cause problems when changes are made to the physical configuration of the computer system. User flexibility in reconfiguring a computer system has become more and more prevalent with the advent of Fibre Channel. Fibre Channel is a communication protocol that enables computer system components that were previously incapable of communicating to be coupled together in a manner that enables communication therebetween. For example, using Fibre Channel a first computer system resource that communicates using SCSI can communicate with a second computer system resource that communicates using Ethernet. An example of a computer system implemented using Fibre Channel is shown in FIG. 4, wherein a host computer 1 is coupled to a storage system 3 via a Fibre Channel cloud 100. It should be appreciated that the Fibre Channel cloud 100 can include a number of switching and hub components, such that the host computer 1 and the storage system 3 can communicate with other system components via the cloud 100.

It should be appreciated that when the computer system of FIG. 4 is brought on line, the host computer 1 will be booted or initialized, and will go through a process of assigning device identifiers (e.g., "/dev/dsk/c0t0d0" as discussed above), to each raw storage device or logical volume accessible to the host computer through the Fibre Channel cloud 100. It should be appreciated that the assignment of a particular one of the communication paths 102a–d as channel c0 is fairly arbitrary, and is not initially significant, so long as each of the paths 102a–d is assigned a unique channel number. Referring to the illustrative example shown in FIG. 4, during initialization, the communication path 102a initially may be assigned channel designation c0 and communication path 102b initially may be assigned channel designation c1. A first logical volume 104 is made visible to the Fibre Channel cloud 100 over a port (not shown) of the storage system 3 that is coupled to path 102a, and a second logical volume 106 is made visible via a port (not shown) coupled to path 102b. Thus, during initialization, the logical volume 104 may be identified by an operating system on the host computer 1 using a device identifier "/dev/dsk/c0t0d0," and the logical volume 106 may be identified using the device identifier "/dev/dsk/c1t0d0".

It should be appreciated that events can occur that may change the physical configuration of the computer system shown in FIG. 1, which may require a rebooting of the host computer 1. For example, one such reconfiguration change may be caused by a failure of the port on the storage system 3 that is coupled to the path 102a. If such a failure were to occur, the storage system 3 can be reconfigured so that the logical volume 104 can be exported from the storage system 3 over the port coupled to the path 102b. Thus, after reconfiguration of the storage system 3, the host computer 1 would generally need to be is rebooted to recognize the reconfigured nature of the computer system. In doing so, it should be appreciated that the path 102a will no longer be recognized, such that upon reinitialization, a different channel number may be assigned to each of the paths 102b–d. For example, the path 102b may be the first channel recognized by the host computer 1 when it reboots, causing this channel to now be identified as channel c0. As a result of this reinitialization, the device identifier for logical volume 106 could change to "/dev/dsk/c0t0d0", and the device identifier for logical volume 104 could change to "/dev/dsk/c0t1d0".

As discussed above, the file system LVM layer 23 executing on the host computer 1 accesses a particular logical volume using the device identifier assigned by the operating system. However, it should be appreciated that as a result of the change to the physical configuration of the computer system, the device identifier for each of the logical volumes 104 and 106 will have changed between the time when the host computer 1 was initially booted, and the time when it is rebooted following the change in the physical configuration of the system. It should be appreciated that this can cause significant problems for applications executing on the host computer 1. For example, an application program that is executing on the host computer 1 and that stores a particular data file in logical volume 104. After the reconfiguration of the storage system 3 and the resulting reboot of the host computer 1, the device identifier previously used by the file system/LVM mapping layer 23 to access logical volume 104 (e.g., "/dev/dsk/c0t0d0" in the example discussed above) will now, unknown to the application program, actually map to the logical volume 106. Therefore, when performing reads, the application program will actually read the wrong data, and when performing writes, the application program will be overwriting the wrong data in the storage system 3.

It should be appreciated from the foregoing that the use of device identifiers that include information that is dependent upon a physical component of the computer system used to access the logical volume or raw storage device can lead to problems when the system is reconfigured, because the device identifiers for one or more logical volumes can change in a manner that is typically not communicated to the application layer 21 (FIG. 2). This can result in the wrong data being accessed for a read or write, or can result in a logical volume becoming inaccessible to an application program which is not capable of accessing the logical volume via its new device identifier.

SUMMARY

One illustrative embodiment of the invention is directed to a method of detecting changes in a configuration of a computer system including a host computer and at least one computer system resource. The method comprises steps of: (A) storing information relating to a reference configuration of the computer system at a first point in time; (B) determining a current configuration of the computer system at a second point in time; (C) comparing the current configuration of the computer system with the reference configuration to determine whether the current configuration differs from the reference configuration; and (D) providing an indication when the current configuration of the computer system differs from the reference configuration.

Another illustrative embodiment of the invention is directed to a computer readable medium encoded with a program for execution on a host computer in a computer system including the host computer and at least one computer system resource. The program, when executed on the computer, performs a method of detecting changes in a configuration of the computer system, the method comprising steps of: (A) storing information relating to a reference configuration of the computer system at a first point in time; (B) determining a current configuration of the computer system at a second point in time; (C)comparing the current configuration of the computer system with the reference configuration to determine whether the current configuration differs from the reference configuration; and (D) providing an indication when the current configuration of the computer system differs from the reference configuration.

A further illustrative embodiment of the invention is directed to a host computer for use in a computer system including the host computer and at least one computer system resource. The host computer comprises: storing means for storing information relating to a reference configuration of the computer system at a first point in time; determining means for determining a current configuration of the computer system at a second point in time; comparing means for comparing the current configuration of the computer system with the reference configuration to determine whether the current configuration differs from the reference configuration; and providing means for providing an indication when the current configuration of the computer system differs from the reference configuration.

DETAILED DESCRIPTION

In accordance with one illustrative embodiment of the invention, a method and apparatus is provided to detect changes in a configuration of a computer system, and to provide an indication that changes to the configuration of the computer system have been detected. This can be done in any number of ways, and the present invention is not limited to any particular implementation. In accordance with one embodiment of the invention, information relating to a known configuration of the computer system is stored at a reference point in time. Thereafter (e.g., in response to a rebooting of the host computer), a current configuration of the computer system is determined. The current configuration of the computer system is compared with the reference (stored) configuration of the computer system to determine whether the current configuration differs from the reference configuration, and when it does, an indication of this difference is provided.

Figure 3:
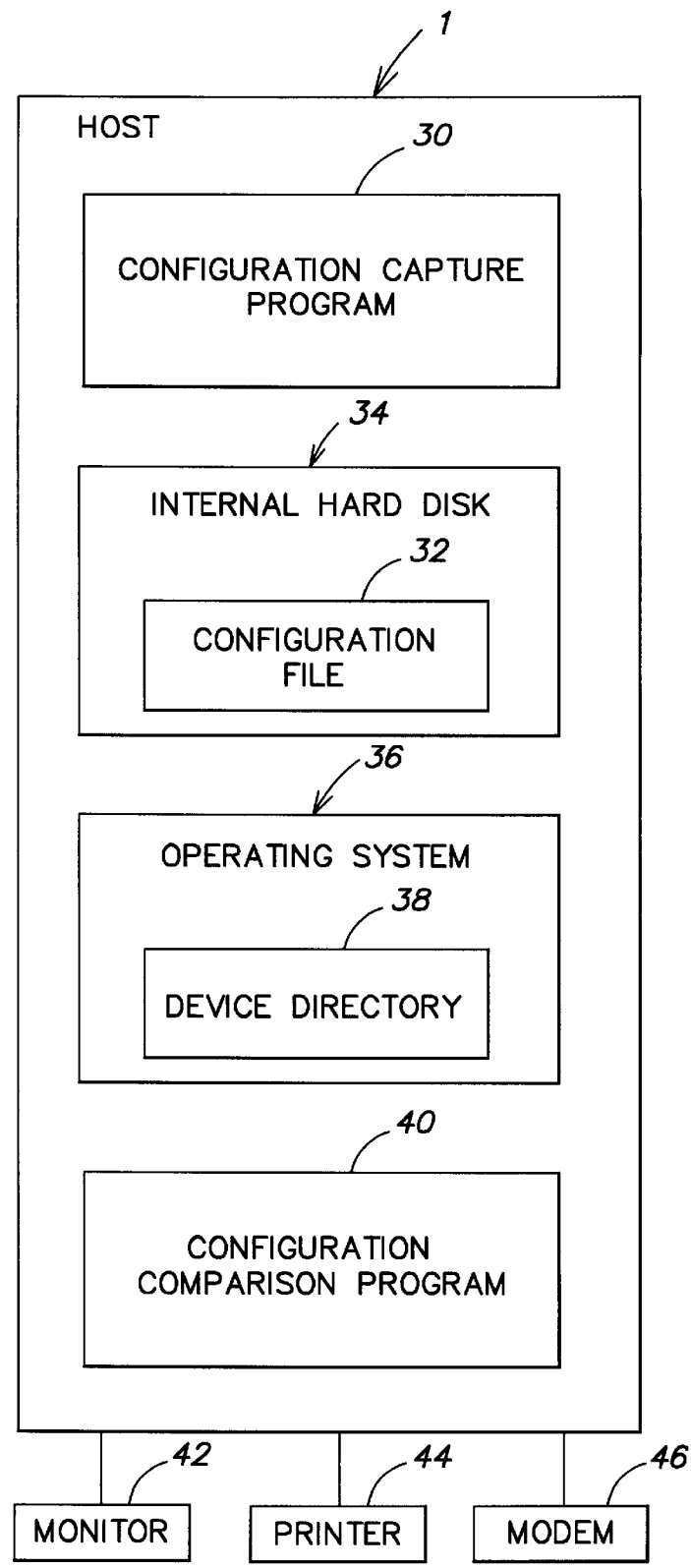
FIG. 3 is a block diagram of a host computer including elements suitable for implementing an embodiment of the present invention.

Information relating to a reference configuration of the computer system may be gathered in any of numerous ways, and the present invention is not limited to any particular implementation. In one embodiment of the invention shown in FIG. 3, a configuration capture program 30 is provided on the host computer 1. When a user determines that the computer system is configured properly, the user may instruct the configuration capture program 30 to collect and store information relating to the then current configuration of the computer system at that reference point in time. As discussed below, this stored information can be used to identify a reference configuration. The configuration capture program 30 may store the information descriptive of the reference configuration in any of numerous ways and on any type of storage medium. For example, the information can be stored in a configuration file 32 on an hard disk 34 internal to the host computer 1.

The configuration capture program 30 may, for example, collect configuration information descriptive of the current configuration of the computer system in any of numerous ways. For example, the configuration capture program 30 may obtain from the operating system 36 of the host computer 1 the unique identifier for each device accessible by the host computer 1. The operating system 36 of the host computer 1 will typically maintain a device directory 38 including information descriptive of each device which the operating system 36 recognizes as being accessible by the host computer. Each device identifier typically includes information descriptive of a physical path, port, or link by which the host computer accesses the device. For example, the device identifier "/dev/dsk/c1t0d0" may be the device identifier of a device that is accessed by the host computer 1 on channel number one (c1), and has a target number (t0) and LUN (d0) zero within the storage system 3.

Once the configuration capture program 30 has the device identifier for a device, it may use the identifier to access the device for the purpose of obtaining additional information pertaining thereto. The additional information that the capture program 30 can access for a particular device will vary depending upon the nature of the system resource. Thus, the present invention is not limited to accessing additional information of any particular type. In accordance with one illustrative embodiment of the invention, it is desirable to retrieve additional information that uniquely identifies the device in a manner that is not dependent upon the physical configuration of the computer system. For example, when the computer system resource is a storage system 3 such as that shown in FIG. 1, the configuration capture program 30 may use a device identifier to access from the storage system 3 information that uniquely identifies the raw storage device or logical volume corresponding thereto. In a storage system 3 such as that shown in FIG. 1, each logical volume will typically include a label that is unique within the storage system 3 and identifies the logical volume. However, it should be appreciated that in some computer systems, multiple storage systems 3 may be accessible by the host computer 1. To handle such a system configuration, each storage system 3 may also be provided with a unique identifier (e.g., a serial number), such that each logical volume in the computer system can be identified by the serial number of the storage system in which it is included, in conjunction with the unique identifier of the logical volume within that storage system.

After the additional information is retrieved from the device to identify it in a manner that is independent of the physical configuration of the computer system, the configuration capture program 30 may store that information in a manner that is associated with the corresponding device identifier that the operating system uses to identify that device in the current configuration of the system. This can be done for each device accessible to the host computer 1 (e.g., for each device in the device directory 38). This associated data set can be stored in the configuration file 32 and serves to identify the reference configuration, which can be used for comparison purposes in a manner discussed below.

As discussed above, it is possible that the configuration of the computer system will change after the configuration file 32 is saved. For example, as mentioned previously, one of the ports 18a–d on the storage system 3 may malfunction, causing the port and storage devices normally accessible through that port to become inaccessible to the host computer 1. Another exemplary way in which the configuration of the computer system may change is that the links between the host computer 1 and the storage system 3 may be reconfigured. Yet another exemplary way in which the configuration of the computer system may change is that logical volumes within the storage system 3 may be added, removed, or exported through a different port on the same or another storage system, thereby causing the contents of the host computer's operating system device directory 38 to change. In the case where a logical volume within storage system 3 moves, a logical volume which was previously accessible using a particular channel, target, and LUN will no longer be accessible using that identifier, but rather will be accessible at a different channel, target, and LUN. However, as discussed above, application programs on the host computer 1 will, via the file system/LVM mapping layer 23, continue to access the logical volume using the old channel, target and LUN identifier, which can cause problems. For example, if no logical volume is accessible at the old channel, target and LUN, any attempt to access the logical volume at that channel, target and old identifier will result in an error. Even worse, if a different logical volume is now accessible at that channel, target and LUN, as in the example discussed above, attempts to read from the logical volume will result in reading the wrong data, and attempts to write to the logical volume will result in writing data to the wrong logical volume.

In one illustrative embodiment of the present invention, changes to the configuration of the computer system are detected and an indication that the configuration of the computer 10 system has changed is provided. This detection can be done in numerous ways. For example, the host computer 1 can be provided with a configuration comparison program 40 that can compare the current (i.e., at the time the program is run) configuration of the computer system with the reference configuration (stored in the manner discussed above) to determine whether any changes have occurred. The configuration comparison program 40 can be executed whenever it is desired to check the configuration of the system. In accordance with one embodiment of the invention, the comparison program 40 is executed each time the host computer 1 is rebooted, but it should be appreciated that the present invention is not limited in this respect. The configuration comparison program 40 determines a current configuration of the computer system, and compares the current configuration of the computer system with the reference configuration to determine whether the current configuration differs from the reference configuration. The configuration comparison program 40 may, for example, determine the current configuration of the computer system in the same manner as that described above with respect to the configuration capture program 30.

The configuration comparison program 40 may, for example, compare the current configuration of the computer system with a reference configuration by retrieving the stored information descriptive of the reference configuration from the configuration file 32. The configuration comparison program 40 may detect, for example, whether new devices are present, old devices have been deleted, or existing devices have moved. When doing so, the configuration comparison program 40 may examine the information for both the current and reference configurations that identifies devices in a manner that is not dependent upon the physical configuration of the computer system (e.g., using the storage system serial number and unique logical volume identifier discussed above). Thus, the status of a device is not determined based on the operating system device identifier which is dependent upon the system configuration, but rather, is based upon information that uniquely identifies the device in a manner that is independent of the configuration of the system.

In one illustrative embodiment of the present invention, an indication is provided by the configuration comparison program 40 when the current configuration of the computer system differs from a reference configuration. For example, the configuration comparison program may provide an indication when the channel through which a particular logical volume is accessible has changed, when a previously accessible logical volume is no longer accessible, or when any other change to the configuration of the computer system is detected.

The indication that the current configuration of the computer system differs from the reference configuration may be provided in any manner, and the present invention is not limited to any particular technique. For example, a text file descriptive of the differences between the current configuration of the computer system and the reference configuration may be generated. The indication may be provided to a human operator by, for example, displaying such a text file on a computer monitor 42, printing the text file on a printer 44, or sending the text file to a human operator in an e-mail message via a modem 46. The human operator may use the information contained within the indication provided by the configuration comparison program 40 to determine what steps, if any, to take in response to the changes in the computer system's configuration to avoid system errors. The operator may, for example, reconfigure the file system/LVM mapping layer 23 to refer to devices using their new device identifiers.

In one embodiment of the invention, the configuration comparison program 40 executes every time the host computer 1 is rebooted, halts the rebooting of the host computer 1 when it is determined that the current configuration of the computer system differs from the reference configuration, and provides an indication that the configuration of the system has changed. The configuration comparison program 40 may then allow a human operator to disregard the message and continue the bootup process.

The configuration comparison program 40 may be implemented to provide an indication of all differences detected between the current configuration of the computer system and the reference configuration, or it may be implemented to provide an indication of only certain types of differences. For example, in a computer system that includes a number of system resources connected to a host computer, in one embodiment of the present invention, the configuration comparison program 40 only provides an indication of differences impacting raw storage devices or logical volumes included in a storage system 3.

Figure 1:
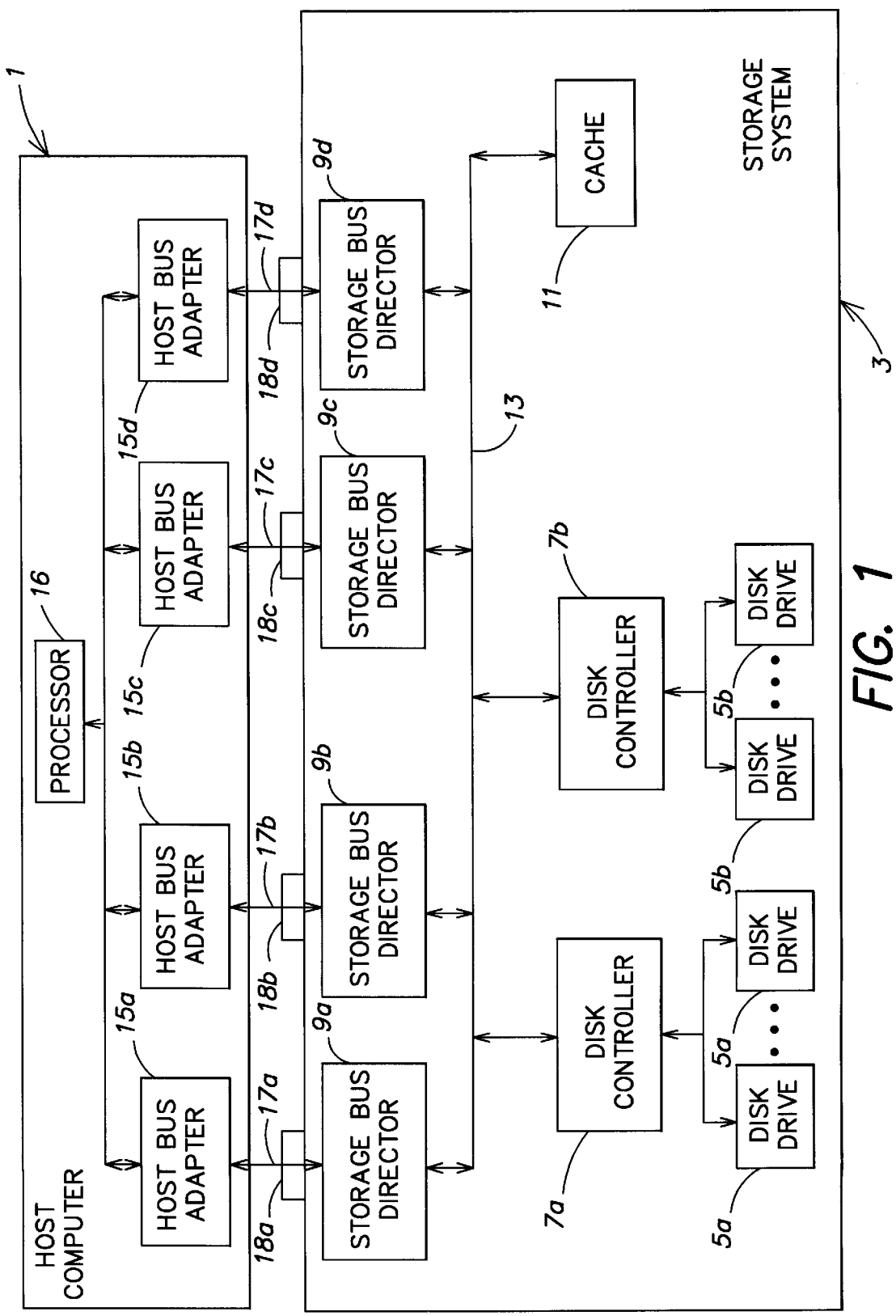
FIG. 1 is a block diagram of an exemplary computer system on which aspects of the present invention can be implemented.
Figure 2:
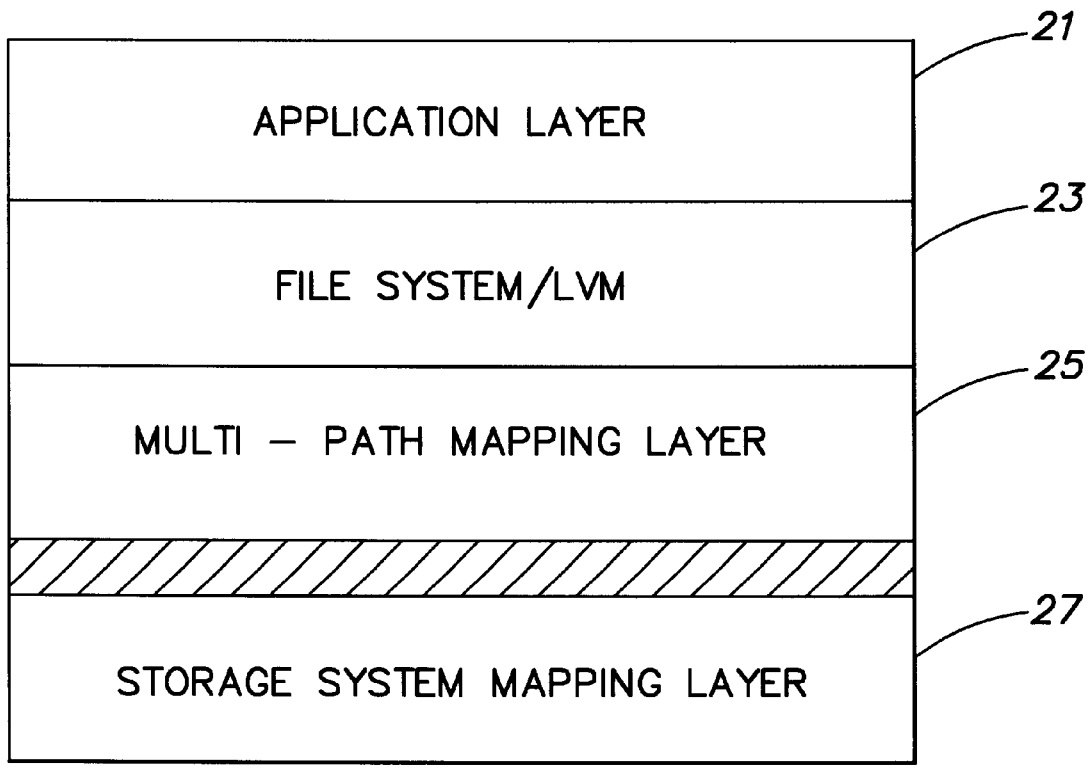
FIG. 2 is a schematic representation of a number of mapping layers that exist in a known computing system.
Figure 4:
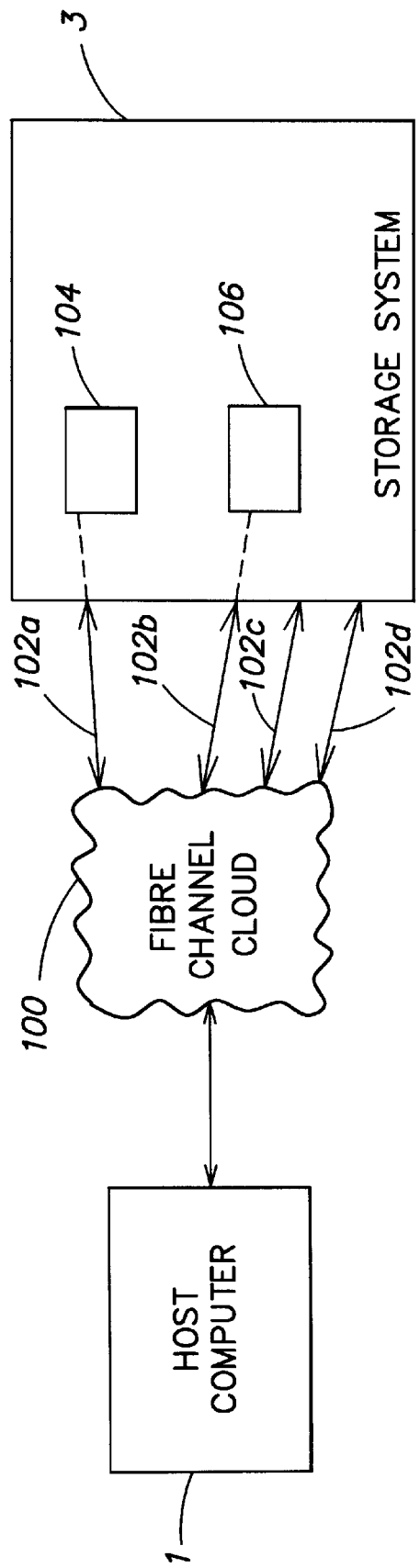
FIG. 4 is a block diagram of a Fibre Channel computer system.

The illustrative embodiments of the present invention discussed above have been described in connection with an illustrative system such as that shown in FIG. 4, wherein the computer system includes a host computer 1 and a computer system resource that is a storage system 3 such as that shown in FIG. 1. However, it should be appreciated that the present invention is not limited in this respect, and that the aspects of the present invention described above can be used in connection with computer systems having numerous other configurations, so that the host computer 1 can determine system configuration changes in connection with numerous system resources other than a storage system 3. In addition, as described above, Fibre Channel has provided an environment wherein system configuration changes have become more prevalent, such that the embodiments of the present invention discussed above can be advantageous when used in connection with a Fibre Channel system. However, it should be appreciated that the present invention is not limited in this respect, and can be used in connection with numerous other system configurations that do not employ the Fibre Channel protocol.

It should be understood that the present invention is not limited to use with any particular computer platform, computer processor, or high-level programming language. Although aspects of the present invention are discussed above as being implemented in a programmed processor, elements of the invention may be implemented in software, hardware, firmware, or any combination thereof. The various elements of the invention, either individually or in combination, may be implemented as a computer program product tangibly embodied in a machine-readable storage device for execution by a computer processor such as the processor 16 shown in FIG. 1. Various steps of embodiments of the invention, such as those described above and illustrated using flow charts, may be performed by a computer processor executing a program (i.e., software or firmware) tangibly embodied on a computerreadable medium to perform functions by operating on input and generating output. The computer-readable medium may be a memory in the host computer 1 (FIG. 1), or a transportable medium such as a compact disk, a floppy disk, or a diskette, such that a computer program embodying the aspect of the present invention can be loaded onto any computer. The computer program is not limited to any particular embodiment and may, for example, include an application program, foreground or background process, driver, or any combination thereof, executing on a single computer processor or multiple computer processors. Computer programming languages suitable for implementing such a system include procedural programming languages, object-oriented programming languages, and any combination thereof.

Having described several embodiments of the invention in detail, various modifications and improvement will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. In a computer system including a host computer and at least one computer system resource, a method of detecting changes in a configuration of the computer system, the method comprising steps of:
   (A) storing information relating to a reference configuration of the computer system at a first point in time;
   (B) determining a current configuration of the computer system at a second point in time;
   (C) comparing the current configuration of the computer system with the reference configuration to determine whether the current configuration differs from the reference configuration; and
   (D) providing an indication when the current configuration of the computer system differs from the reference configuration;
      wherein the at least one computer system resource includes a plurality of devices accessible by the host computer, and wherein the step (A) includes a step of storing the information relating to the reference configuration in a form that includes at least one component of information that uniquely identifies each one of the plurality of devices accessible by the host computer using information independent of the reference configuration of the computer system.

2. The method of claim 1, wherein the step (D) comprises a step of providing the indication to include information descriptive of a difference between the current configuration and the reference configuration.

3. The method of claim 1, wherein the step (B) includes a step of determining the current configuration of the computer system in response to a rebooting of the host computer.

4. The method of claim 3, further including a step of halting the rebooting of the host computer when it is determined in the step (C) that the current configuration of the computer system differs from the reference configuration.

5. The method of claim 1, wherein the step (B) includes a step of determining the current configuration of the computer system each time the host computer is rebooted.

6. The method of claim 5, further including a step of halting the rebooting of the host computer when it is determined in the step (C) that the current configuration of the computer system differs from the reference configuration.

7. The method of claim 1, wherein the at least one computer system resource includes at least one storage system and the plurality of devices includes a plurality of logical volumes of data, and wherein the step (A) includes a step of storing, for each one of the logical volumes, an identifier that uniquely identifies the logical volume among the plurality of logical volumes in the at least one storage system.

8. The method of claim 7, wherein the at least one storage system includes a plurality of storage systems, and wherein the step (A) includes a step of storing, for each one of the plurality of logical volumes, an identifier that uniquely identifies a one of the plurality of storage systems in which the one of the plurality of logical volumes is stored.

9. In a computer system including a host computer and at least one computer system resource, a method of detecting changes in a configuration of the computer system, the method comprising steps of:
   (A) storing information relating to a reference configuration of the computer system at a first point in time;
   (B) determining a current configuration of the computer system at a second point in time;
   (C) comparing the current configuration of the computer system with the reference configuration to determine whether the current configuration differs from the reference configuration; and
   (D) providing an indication when the current configuration of the computer system differs from the reference configuration;
      wherein the at least one computer system resource includes a plurality of devices accessible by the host computer, and wherein the step (A) includes a step of storing the information relating to the reference configuration in a form that includes first and second identifiers for each one of the plurality of devices accessible by the host computer, the first identifier identifying the one of the plurality of devices using information relating to the reference configuration of the computer system, the second identifier identifying the one of the plurality of devices using information independent of the reference configuration of the computer system.

10. The method of claim 9, wherein the first identifier includes information descriptive of a path through which the one of the plurality of logical volumes is accessible to the host computer.

11. The method of claim 9, wherein the step (B) includes a step of determining the current configuration of the computer system in response to a rebooting of the host computer.

12. The method of claim 9, wherein the step (B) includes a step of determining the current configuration of the computer system each time the host computer is rebooted.

13. The method of claim 9, wherein the step (D) comprises a step of providing the indication to include information descriptive of a difference between the current configuration and the reference configuration.

14. The method of claim 9, wherein the at least one computer system resource includes at least one storage system and the plurality of devices includes a plurality of logical volumes of data, and wherein the step (A) includes a step of storing the first and second identifiers for each of the plurality of logical volumes.

15. The method of claim 14, wherein the second identifier for each one of the logical volumes uniquely identifies the logical volume among the plurality of logical volumes in the at least one storage system.

16. The method of claim 15, wherein the at least one storage system includes a plurality of storage systems, and wherein the second identifier for each one of the logical volumes uniquely identifies a one of the plurality of storage systems in which the one of the plurality of logical volumes is stored.

17. A computer readable medium encoded with a program for execution on a host computer in a computer system including the host computer and at least one computer system resource, the program, when executed on the computer, performs a method of detecting changes in a configuration of the computer system, the method comprising steps of:

(A) storing information relating to a reference configuration of the computer system at a first point in time;

(B) determining a current configuration of the computer system at a second point in time;

(C) comparing the current configuration of the computer system with the reference configuration to determine whether the current configuration differs from the reference configuration; and (D) providing an indication when the current configuration of the computer system differs from the reference configuration;

wherein the at least one computer system resource includes a plurality of devices accessible by the host computer, and wherein the step (A) includes a step of storing the information relating to the reference configuration in a form that includes at least one component of information that uniquely identifies each one of the plurality of devices accessible by the host computer using information independent of the reference configuration of the computer system.

18. The computer readable medium of claim 17, wherein the step (D) comprises a step of providing the indication to include information descriptive of a difference between the current configuration and the reference configuration.

19. The computer readable medium of claim 17, wherein the step (B) includes a step of determining the current configuration of the computer system in response to a rebooting of the host computer.

20. The computer readable medium of claim 19, wherein the method further includes a step of halting the rebooting of the host computer when it is determined in the step (C) that the current configuration of the computer system differs from the reference configuration.

21. The computer readable medium of claim 17, wherein the at least one computer system resource includes at least one storage system and the plurality of devices includes a plurality of logical volumes of data, and wherein the step (A) includes a step of storing, for each one of the logical volumes, an identifier that uniquely identifies the logical volume among the plurality of logical volumes in the at least one storage system.

22. The computer readable medium of claim 21, wherein the at least one storage system includes a plurality of storage systems, and wherein the step (A) includes a step of storing, for each one of the logical volumes, an identifier that uniquely identifies a one of the plurality of storage systems in which the one of the plurality of logical volumes is stored.

23. The computer readable medium of claim 17, wherein the step (B) includes a step of determining the current configuration of the computer system each time the host computer is rebooted.

24. The computer readable medium of claim 23, wherein the method further includes a step of halting the rebooting of the host computer when it is determined in the step (C) that the current configuration of the computer system differs from the reference configuration.

25. A computer readable medium encoded with a program for execution on a host computer in a computer system including the host computer and at least one computer system resource, the program, when executed on the computer, performs a method of detecting changes in a configuration of the computer system, the method comprising steps of:

(A) storing information relating to a reference configuration of the computer system at a first point in time;

(B) determining a current configuration of the computer system at a second point in time;

(C) comparing the current configuration of the computer system with the reference configuration to determine whether the current configuration differs from the reference configuration; and (D) providing an indication when the current configuration of the computer system differs from the reference configuration;

wherein the at least one computer system resource includes a plurality of devices accessible by the host computer, and wherein the step (A) includes a step of storing the information relating to the reference configuration in a form that includes first and second identifiers for each one of the plurality of devices accessible by the host computer, the first identifier identifying the one of the plurality of devices using information relating to the reference configuration of the computer system, the second identifier identifying the one of the plurality of devices using information independent of the reference configuration of the computer system.

26. The computer readable medium of claim 25, wherein the first identifier includes information descriptive of a path through which the one of the plurality of logical volumes is accessible to the host computer.

27. The computer readable medium of claim 25, wherein the step (B) includes a step of determining the current configuration of the computer system in response to a rebooting of the host computer.

28. The computer readable medium of claim 25, wherein the step (B) includes a step of determining the current configuration of the computer system each time the host computer is rebooted.

29. The computer readable medium of claim 25, wherein the step (D) comprises a step of providing the indication to include information descriptive of a difference between the current configuration and the reference configuration.

30. The computer readable medium of claim 25, wherein the at least one computer system resource includes at least one storage system and the plurality of devices includes a plurality of logical volumes of data, and wherein the step (A) includes a step of storing the first and second identifiers for each of the plurality of logical volumes.

31. The computer readable medium of claim 30, wherein the second identifier for each one of the logical volumes uniquely identifies the logical volume among the plurality of logical volumes in the at least one storage system.

32. The computer readable medium of claim 31, wherein the at least one storage system includes a plurality of storage systems, and wherein the second identifier for each one of the logical volumes uniquely identifies a one of the plurality of storage systems in which the one of the plurality of logical volumes is stored.

33. A host computer for use in a computer system including the host computer and at least one computer system resource, the host computer comprising:

storing means for storing information relating to a reference configuration of the computer system at a first point in time;

determining means for determining a current configuration of the computer system at a second point in time;

comparing means for comparing the current configuration of the computer system with the reference configuration to determine whether the current configuration differs from the reference configuration; and providing means for providing an indication when the current configuration of the computer system differs from the reference configuration;

wherein the at least one computer system resource includes a plurality of devices accessible by the host computer, and wherein the storing means includes means for storing the information relating to the reference configuration in a form that includes at least one component of information that uniquely identifies each one of the plurality of devices accessible by the host computer using information independent of the reference configuration of the computer system.

34. The host computer of claim 33, wherein the providing means comprises means for providing the indication to include information descriptive of a difference between the current configuration and the reference configuration.

35. The host computer of claim 33, wherein the at least one computer system resource includes at least one storage system and the plurality of devices includes a plurality of logical volumes of data, and wherein the storing means includes means for storing, for each one of the logical volumes, an identifier that uniquely identifies the logical volume among the plurality of logical volumes in the at least one storage system.

36. The host computer of claim 35, wherein the at least one storage system includes a plurality of storage systems, and wherein the storing means includes means for storing, for each one of the logical volumes, an identifier that uniquely identifies a one of the plurality of storage systems in which the one of the plurality of logical volumes is stored.

37. The host computer of claim 33, wherein the determining means includes means for determining the current configuration of the computer system in response to a rebooting of the host computer.

38. The host computer of claim 37, further including means for halting the rebooting of the host computer when it is determined by the comparing means that the current configuration of the computer system differs from the reference configuration.

39. The host computer of claim 33, wherein the determining means includes means for determining the current configuration of the computer system each time the host computer is rebooted.

40. The host computer of claim 39, further including means for halting the rebooting of the host computer when it is determined by the comparing means that the current configuration of the computer system differs from the reference configuration.

41. A host computer for use in a computer system including the host computer and at least one computer system resource, the host computer comprising:
    storing means for storing information relating to a reference configuration of the computer system at a first point in time;
    determining means for determining a current configuration of the computer system at a second point in time;
    comparing means for comparing the current configuration of the computer system with the reference configuration to determine whether the current configuration differs from the reference configuration; and
    providing means for providing an indication when the current configuration of the computer system differs from the reference configuration;
    wherein the at least one computer system resource includes a plurality of devices accessible by the host computer, and wherein the storing means includes means for storing the information relating to the reference configuration in a form that includes first and second identifiers for each one of the plurality of devices accessible by the host computer, the first identifier identifying the one of the plurality of devices using information relating to the reference configuration of the computer system, the second identifier identifying the one of the plurality of devices using information independent of the reference configuration of the computer system.

42. The host computer of claim 41, wherein the first identifier includes information descriptive of a path through which the one of the plurality of logical volumes is accessible to the host computer.

43. The host computer of claim 41, wherein the determining means includes means for determining the current configuration of the computer system in response to a rebooting of the host computer.

44. The host computer of claim 41, wherein the determining means includes means for determining the current configuration of the computer system each time the host computer is rebooted.

45. The host computer of claim 41, wherein the providing means comprises means for providing the indication to include information descriptive of a difference between the current configuration and the reference configuration.

46. The host computer of claim 41, wherein the at least one computer system resource includes at least one storage system and the plurality of devices includes a plurality of logical volumes of data, and wherein the storing means includes means for storing the first and second identifiers for each of the plurality of logical volumes.

47. The host computer of claim 46, wherein the second identifier for each one of the logical volumes uniquely identifies the logical volume among the plurality of logical volumes in the at least one storage system.

48. The host computer of claim 47, wherein the at least one storage system includes a plurality of storage systems, and wherein the second identifier for each one of the logical volumes uniquely identifies a one of the plurality of storage systems in which the one of the plurality of logical volumes is stored.

* * * * *